（12）United States Patent
Cremers et al.

(10) Patent No.: US 8,500,878 B2
(45) Date of Patent: Aug. 6, 2013

(54) INERTING SYSTEM FOR AN AIRCRAFT (75) Inventors: Joerg Cremers, Hamburg (DE);
Klaus-Dieter Kricke, Pinneberg (DE);
Christian Schumacher, Wedel (DE)

(73) Assignee: Airbus Operations GmbH (DE)

( * ) Notice: Subject to any disclaimer, the term of this patent is extended or adjusted under 35 U.S.C. 154(b) by 217 days.

(21) Appl. No.: 12/993,183

(22) PCT Filed: May 20, 2009

(86) PCT No.: PCT/EP2009/056180
§ 371 (c)(1),
(2), (4) Date: Nov. 17, 2010

(87) PCT Pub. No.: WO2009/141400
PCT Pub. Date: Nov. 26, 2009

(65) Prior Publication Data
US 2011/0062288 A1 Mar. 17, 2011

Related U.S. Application Data (60) Provisional application No. 61/128,385, filed on May 21, 2008.

(30) Foreign Application Priority Data

May 21, 2008 (DE) .......................... 10 2008 024 503

(51) Int. Cl.
*B01D 53/02* (2006.01)
*B64D 37/32* (2006.01)
(52) U.S. Cl.
USPC .......................... 96/109; 55/344; 244/135 R (58) Field of Classification Search
USPC .......................... 55/344; 96/109; 244/135 R
See application file for complete search history.

(56) References Cited

U.S. PATENT DOCUMENTS

| 4,681,602 | A | 7/1987 | Glenn et al. |
| 6,729,359 | B2 * | 5/2004 | Jones ............... 141/1 |

(Continued)

FOREIGN PATENT DOCUMENTS

| DE | 4221593 A1 | 1/1993 |
| DE | 102004026647 A1 | 1/2006 |

(Continued)

OTHER PUBLICATIONS

Smith, Aviation, Space, and Environmental Medicine, 78(10); 979-984 (2007).

(Continued)

*Primary Examiner* — Christopher P Jones
(74) *Attorney, Agent, or Firm* — Lerner, David, Littenberg, Krumholz & Mentlik, LLP (57) ABSTRACT The invention pertains to an inerting system for an aircraft featuring at least one air separation module with at least one air inlet, a first air outlet and a second air outlet. The air separation module is designed for splitting an input air flow into a first air flow and a second air flow, wherein the first air flow is enriched with oxygen in comparison with the input air flow and discharged at the first air outlet and the second air flow is enriched with nitrogen in comparison with the input air flow and discharged at the second air outlet. In comparison with known inerting systems, the inerting system according to the invention is characterized in that the air inlet can be connected to an air extraction point in an air processing system and the inerting system is designed for routing the first air flow into a cabin to be air-conditioned.

16 Claims, 6 Drawing Sheets

U.S. PATENT DOCUMENTS

| | | |
|---|---|---|
| 6,955,710 B2 | 10/2005 | Lessi et al. |
| 7,172,156 B1 | 2/2007 | Jones |
| 2003/0233936 A1 | 12/2003 | Crome |
| 2004/0065778 A1* | 4/2004 | Jones .................. 244/135 R |
| 2005/0115404 A1 | 6/2005 | Leigh et al. |
| 2005/0205594 A1 | 9/2005 | Evans et al. |
| 2005/0235659 A1 | 10/2005 | Brutscher et al. |
| 2005/0263005 A1 | 12/2005 | Rittner et al. |
| 2006/0151669 A1* | 7/2006 | Jones .................. 244/129.2 |
| 2006/0243859 A1 | 11/2006 | Lessi et al. |
| 2007/0054610 A1 | 3/2007 | Jensen |
| 2007/0062371 A1 | 3/2007 | Eilers |
| 2008/0110603 A1* | 5/2008 | Fellague et al. .............. 165/140 |
| 2009/0277445 A1 | 11/2009 | Markwart |

FOREIGN PATENT DOCUMENTS

| | | |
|---|---|---|
| DE | 60300751 T2 | 3/2006 |
| DE | 60207788 T2 | 9/2006 |
| DE | 102006007286 A1 | 8/2007 |
| EP | 0975518 A1 | 2/2000 |
| EP | 1190945 A1 | 3/2002 |
| EP | 1273515 A2 | 1/2003 |
| EP | 1358911 A1 | 11/2003 |
| EP | 1580123 A2 | 9/2005 |

OTHER PUBLICATIONS

Fouillot, Statistical Study of Sickness Reports in Air Transportation, vol. 1, 6 pages (1995).

Ernsting, Aviation, Space, Environmental Medicine, 49(3); 495-502 (1978).

Rodig et al., Manual of the flight medicine, Aeromedical of institutes of German Airforce, 34 pages (2002). (English translation of p. 1 only).

* cited by examiner

INERTING SYSTEM FOR AN AIRCRAFT

CROSS-REFERENCE TO RELATED APPLICATIONS

This application is a national phase entry under 35 U.S.C. §371 of International Application No. PCT/EP2009/056180, filed May 20, 2009, published in German, which claims the benefit of the filing date of German Patent Application No. 10 2008 024 503.8, filed May 21, 2008 and U.S. Provisional Patent Application No. 61/128,385, filed May 21, 2008, the entire disclosures of which are hereby incorporated herein by reference.

TECHNICAL FIELD

The invention relates to an inerting system and an environmental control system for an aircraft for inerting a fuel tank.

TECHNOLOGICAL BACKGROUND

Due to the low outside temperatures and the low atmospheric pressure at high altitudes, environmental control systems are an indispensable component of modern commercial aircraft. Only the utilization of such systems makes it possible to transport passengers over greater distances. The architecture of environmental control systems is subject to a constant adaptation and optimization process. For example, new regulations stipulate that aircraft be equipped with an inerting system for generating and introducing nitrogen into the fuel tanks for safety reasons in order to reduce the fuel explosion hazard. Such inerting systems are also known under the English technical term "On Board Inert Gas Generation Systems" (abbreviated "OBIGGS"). In the context of the optimization of environmental control systems, the additional fuel consumption required for the operation likewise needs to be minimized during their design.

Environmental control systems that operate with bleed air diverted from engines are currently the most widely used design. In such environmental control systems, the bleed air is usually diverted from one or more engines at one of two different locations depending on the flight situation, e.g., an intermediate pressure opening ("intermediate pressure port") and a high pressure opening ("high pressure port"). The utilization of bleed air for the air-conditioning is advantageous because the bleed air has a relatively high pressure, as well as a relatively high temperature, and therefore can be regulated to a broad range of desired pressures and temperatures. Bleed air diverted in the described fashion can also be used for other consumer systems such as, for example, de-icing systems ("wing ice protection systems") or even inerting systems.

Alternatively, inerting systems may also be supplied with used air that is extracted from the passenger cabin of the aircraft. The air in a passenger cabin is regularly renewed by supplying the cabin with fresh air and discharging existing cabin air therefrom. A significant portion of the air discharged from the cabin is reused by admixing it to the flow of fresh air being supplied to the cabin. The ratio of fresh air to recirculated air typically amounts to approximately 50-60%. The remainder of the cabin air is discharged into the surroundings of the aircraft, wherein outflow valves provided for this purpose may also be simultaneously used for regulating the cabin pressure.

An inerting system usually comprises an air separation module that contains, for example, zeolite membranes, through which an air flow is pressed. Due to the different mass transfer rates for nitrogen and oxygen, this makes it possible to split the air flow such that air flows with higher nitrogen content and higher oxygen content are obtained. The air fraction enriched with nitrogen is routed into fuel tanks such that the oxygen present at this location is displaced. The air fraction enriched with oxygen is frequently not reused or routed into the passenger cabin after it is processed with elaborate auxiliary measures.

The efficiency of an inerting system essentially depends on the ratio of input pressure to output pressure, on the relative humidity of the air, on the temperature, the air quality and the ozone concentration. In order to optimize the air separation process and to protect the sensitive membranes from damages, the inerting system usually conditions the bleed air before it reaches the membranes. The devices required for this process such as compressors, filters, air cooling modules, waters separators and the like are integrated into the inerting system and create corresponding costs, weight and space requirement.

For example, U.S. Pat. No. 7,172,156 B1 describes an inerting system that is supplied with bleed air from aircraft engines. The bleed air is pre-conditioned with filters and heat exchangers before it reaches the air separation module. The air fraction enriched with nitrogen is routed to fuel tanks and the air fraction enriched with oxygen is discharged outboard into the surroundings of the aircraft. The disclosed inerting system furthermore contains a compressor and a turbine that lead to a high complexity of the inerting system, as well as a high weight thereof.

US 2007/0062371 A1 describes an inerting system that is supplied with used cabin air, wherein the air fraction enriched with oxygen is returned into the cabin from the inerting system. However, this publication does not elaborate on how a pressure differential between the input air flow and output air flows, which is required for the function of the inerting system, should be generated during all flight phases. At the cruising altitude, the air enriched with oxygen is discharged into the atmosphere such that it expands. An air inlet is simultaneously positioned in the immediate vicinity of the air outlet and once again takes in the air enriched with oxygen that was discharged into the surroundings in order to compress it to a higher pressure than the pressure in the passenger cabin with the aid of compressors. However, mixing with ambient air takes place during this process.

Lastly, EP 0975518 B1 and EP 1358911 B1 describe an environmental control system, in which an oxygen generating device ("On Board Oxygen Generation System" or, in abbreviated form, "OBOGS") is used for enhancing the comfort by introducing air with an elevated oxygen content into the cabin.

SUMMARY OF THE INVENTION

In the above-described systems known from the prior art, it is disadvantageous that either air enriched with oxygen is wasted by being discharged into the surroundings of the aircraft or the pressure level of the air introduced into an inerting system is so low that compressors need to be used for introducing air enriched with oxygen into the cabin. It is furthermore disadvantageous that inerting systems according to the prior art feature elaborate devices for pre-conditioning bleed air that create additional costs and weight.

It is therefore the object of the invention to diminish or to eliminate one or more of the above-described disadvantages. The invention aims, in particular, to propose an inerting system that is able to introduce air enriched with nitrogen into fuel tanks and air enriched with oxygen into the passenger cabin of an aircraft, if possible without separate compressors or other auxiliary devices for pre-conditioning air.

This object is attained with an inerting system with the characteristics of independent claim 1. Advantageous additional developments are disclosed in the dependent claims.

The inerting system according to the invention comprises at least one air separation module that splits an input air flow at an inlet of the air separation module into two air flows, wherein the first air flow is enriched with oxygen and routed to a first air outlet and the second air flow is enriched with nitrogen and routed to a second air outlet.

In order to allow an efficient generation of air enriched with nitrogen, it is advantageous to utilize an air source in the form of one or more air sources that are tapped into regions in the aircraft referred to as "air extraction points" below, wherein at least one of the air extraction points is provided within an air processing system.

An air processing system—that, for example, also performs a thermal process in an air cycle—may feature a number of lines, in which air with different pressures and temperatures is transported. It is possible to tap into the air flow transported in one or more of these lines such that an input air flow for the air separation module is obtained. This provides—depending on the air extraction point—the advantage that, for example, pre-conditioned air could be extracted from the air processing system such that the process of pre-conditioning the air introduced into the air separation module is already carried out by the air processing system. This would eliminate the need for corresponding devices in the inerting system such that the weight could be additionally reduced due to the elimination of said devices. It is possible to eliminate, in particular, a separate dehumidification, compression and decontamination in the inerting system itself. It is also preferred that a dehumidifying unit of the air processing system can either be switched on or avoided with the aid of a bypass depending on the flight phase and the specific properties of the ambient air associated therewith.

It would be conceivable to realize several other preferred embodiments of the inerting system according to the invention, each of which individually has a number of advantages in comparison with inerting systems known from the prior art.

Since the pressures occurring within the lines of an air processing system can be relatively high in comparison with the passenger cabin, it is possible to carry out an air separation, in which the pressures of the first air flow and of the second air flow are higher than the pressure in the passenger cabin. Consequently, it is not necessary to discharge air enriched with oxygen into the aircraft surroundings—as described in the prior art—in order to generate a sufficient pressure differential for operating the air separation module such that the first air flow enriched with oxygen can be directly or indirectly introduced into the passenger cabin. In another preferred embodiment, the introduction of air enriched with oxygen into a passenger cabin therefore should be achieved, if possible without compressors or the like. Furthermore a compressor connected upstream of the air separation module may be eliminated.

In a preferred embodiment, air from a bleed air system ("bleed air") may be extracted alternatively or additionally to tapping air from an air processing system by arranging at least one additional air extraction point on at least one bleed air line. Consequently, conditioned air only needs to be extracted from the air processing system when the humidity of the bleed air is not optimal for the operation of an air separation module in the inerting system according to the invention. This is usually the case once the aircraft has reached its stationary cruising altitude. If the humidity of the air is excessively high, it is preferred to first carry out a water separation process by means of the air processing system.

In a particularly preferred embodiment, the extraction point is selected by means of a control unit and correspondingly valves are actuated. The control unit could be integrated into a control unit of the environmental control or air processing system and automatically select one or more air extraction points for supplying the air inlet of the air separation module. The correct selection of one or more air extraction points and the fact that the air only passes through dehumidifiers and the like if so required due to the humidity of the air reduce the additional fuel consumption of the aircraft if the system has an optimal design.

In another embodiment, an air extraction point could be provided, for example, in the high-pressure section of an air processing system that carries out a washbox air cycle, wherein this air extraction point supplies pressurized air to the air inlet of the air separation module. A relatively high pressure ratio between the extracted air and the pressure in the passenger cabin can be realized such that not only the air fraction enriched with nitrogen can be introduced into the fuel tanks from the inerting system without other auxiliary means, but the fraction enriched with oxygen also does not have to be compressed by means of separate compressors in order to be introduced into the passenger cabin. The comfort in the passenger cabin therefore can be enhanced by continuing to use a waste product of an inerting system without substantial auxiliary elements.

In a favorable embodiment of the inerting system according to the invention, at least one of the other air extraction points is arranged on at least one bleed air line situated downstream of a primary heat exchanger referred to the flow direction in order to take into account the temperature sensitivity of currently available air separation modules and prevent damages to the membranes thereof. By means of adequate controlling the above mentioned valves also several bleed air lines may be tapped, wherein the respective air flows may be combined or used exclusively.

In another advantageous embodiment, at least one of the other air extraction points is arranged on at least one bleed air line situated upstream of a primary heat exchanger referred to the flow direction. This is more sensible energetically although a particularly robust air separation module is required in this case.

In another preferred embodiment of the inerting system according to the invention, a compressor is used at the air inlet of the air separation module in order to increase the air pressure. This is particularly sensible if the air inlet of the air separation module is supplied with used air from the aircraft cabin, namely in order to increase the pressure level in such a way that the first air flow enriched with oxygen can be once again returned into the cabin. Although this embodiment does not have an optimal energetic design, it could be retrofitted into already designed environmental control systems of an aircraft with relative ease.

Thereby it may make sense to use already existing compressors, for example when a fresh water system of the aircraft is equipped with a compressor for pressurizing, or the auxiliary turbine (APU, "Auxiliary Power Unit").

In a particularly preferred embodiment of the inerting system according to the invention, the first air flow enriched with oxygen is introduced into a mixing unit for mixing fresh air and recirculated cabin air and the first air outlet can be connected to the mixing unit for this purpose. Due to this measure, existing environmental control systems that usually already feature a mixing unit can be significantly enhanced with relatively low constructive expenditures.

In another preferred embodiment, the first air outlet of the air separation module furthermore can be connected to the cabin of the aircraft in order to introduce air enriched with oxygen. This could be used for the purposeful introduction of air enriched with oxygen into special regions of the cabin such that it would be possible, in particular, to increase the oxygen concentration locally. On the other hand, air enriched with oxygen could also be introduced into the passenger cabin in the immediate vicinity of air outlets of the environmental control system such that the air enriched with oxygen is adequately mixed with conditioned air and the oxygen concentration is essentially homogenous.

In another advantageous embodiment, a relatively small additional compressor is preferably utilized for intermediately storing air enriched with oxygen in a corresponding tank at the first air outlet of the air separation module. Due to this measure, it is possible to deliver air enriched with oxygen into the cabin or to other systems on demand, for example, via a controllable valve.

In another advantageous embodiment of the inerting system according to the invention, an oxygen generating device ("On Board Oxygen Generation System" or, in abbreviated form, OBOGS) preferably is used instead of or in addition to an OBIGGS and makes it possible to generate air with a very high oxygen content that almost lies in the range of pure oxygen. One waste product produced during the generation of air enriched with oxygen by means of this system is an air flow enriched with nitrogen that can be used for inerting fuel tanks. Air that is highly enriched with oxygen could be used, for example, for refilling empty oxygen cylinders on board the aircraft or for purposefully supplying certain regions of the aircraft with oxygen. For example, a Crew Rest Compartment, a Flight Rest Compartment, the cockpit or connections for therapeutic oxygen and the like could be considered in this respect. It would be advantageous to provide an air compressor for this purpose. In order to realize a favorable energetic operation of the compressor and the OBOGS, the inlet of the compressor could be connected to the passenger cabin while the outlet of a turbine connected to the compressor could be connected to the external flow on the aircraft. Due to this measure, the pressure differential between the passenger cabin and the surroundings of the aircraft can be used for generating energy. When utilizing a combination of an OBOGS and an OBIGGS, it is furthermore advantageous to integrate the OBOGS into the OBIGGS.

The invention is furthermore attained with an environmental control system, into which an inerting system according to the above-described aspects is integrated.

SHORT DESCRIPTION OF THE DRAWINGS

The invention is elucidated in greater detail below with reference to figures. In these figures, identical objects are identified by the same reference symbols. The figures show.

DETAILED DESCRIPTION OF EXEMPLARY EMBODIMENTS

Figure 1:
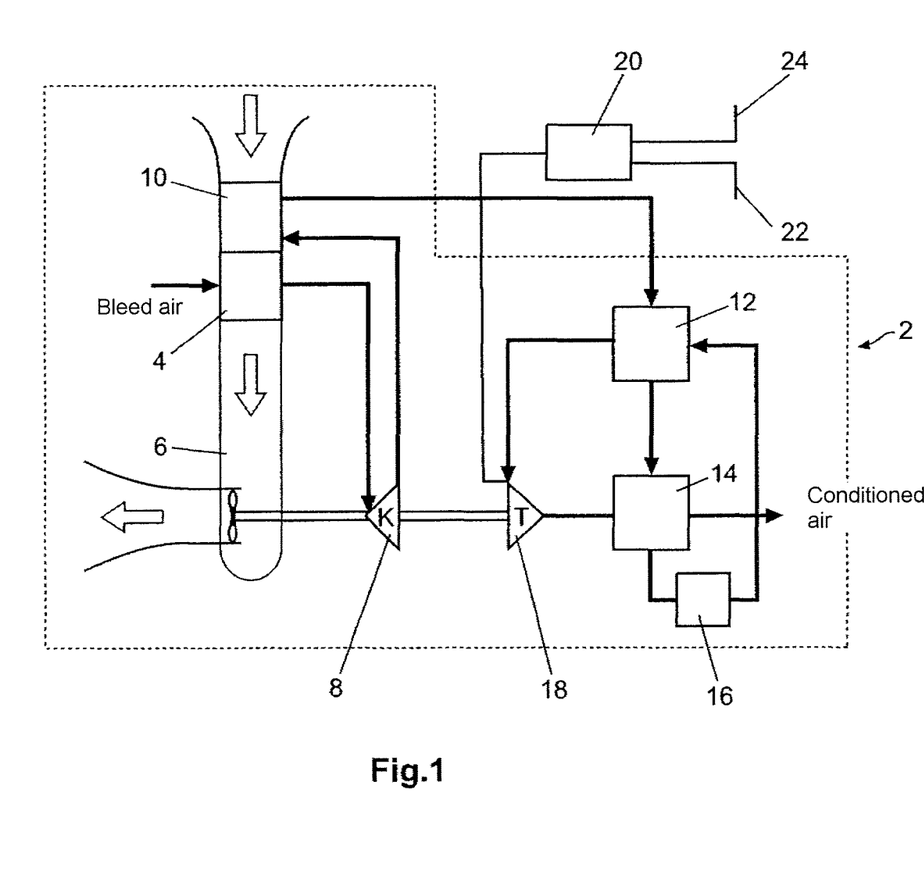
FIG. 1: a schematic representation of the inerting system according to the invention with an air extraction point on the turbine of an air processing system.

A first exemplary embodiment of the inerting system according to the invention is illustrated in FIG. 1. This figure shows an air processing system 2 that serves for processing bleed air from an engine in such a way that it can be used for air-conditioning a passenger cabin of an aircraft. The bleed air extracted from an intermediate pressure extraction point of an engine has, for example, a temperature of approximately 200° C. and a pressure of 3 bar. In the arrangement illustrated in FIG. 1, it flows through a primary heat exchanger 4 that is arranged in a ram-air duct 6. This causes the temperature of the bleed air to drop, for example, to approximately 100° C. The pressure, in contrast, only drops by a relatively small amount and still lies at approximately 2.9 bar downstream of the heat exchanger 4. A compressor 8 compresses the bleed air such that the pressure rises, for example, to 4.8 bar and the temperature increases to approximately 180° C. The compressed air ultimately reaches a main heat exchanger 10 that is also arranged in the ram-air duct 6. After passing through the main heat exchanger 10, air with a pressure of 4.7 bar and a temperature of slightly above 40° C. is available. Any water contained in the air is extracted therefrom after it passes through an intermediate superheater 12 (also referred to as "reheater") by means of condensation in a condenser 14 and separated in the water separator 16. Subsequently, the air is expanded in the turbine 18 and cools quite significantly during this process. The conditioned air subsequently exits the air processing system 2 with a temperature, for example, of approximately −8° C. and a pressure of 1.1 bar.

Part of the dry air that flows from the intermediate superheater 12 and is routed to the turbine 18 of the air processing system 2 is also introduced into an air separation module 20 (in this context, also referred to as "OBIGGS," an abbreviation for "On Board Inert Gas Generation System"), in which it is split into a first air flow 22 with higher oxygen content and a second air flow 24 with higher nitrogen content. The second air flow 24 enriched with nitrogen is used for inerting fuel tanks that are not illustrated in detail in FIG. 1.

The first air flow 22 enriched with oxygen is suitable for being directly or indirectly introduced into the passenger cabin. Due to the relatively high pressure level of the air originating from the intermediate superheater 12 at the air inlet of the air separation module 20 and the passenger cabin pressure of approximately 0.8 bar, a relatively high pressure ratio, for example, in excess of 5 is respectively reached between the air inlet and the first air outlet and the second air outlet of the air separation module 20 such that no other auxiliary compressors need to be used for introducing the first air flow 22 enriched with oxygen. The air flow 22 enriched with oxygen is preferably routed into a not-shown mixing unit, in which it mixes with recirculated and conditioned air from the air processing system 2.

Figure 2:
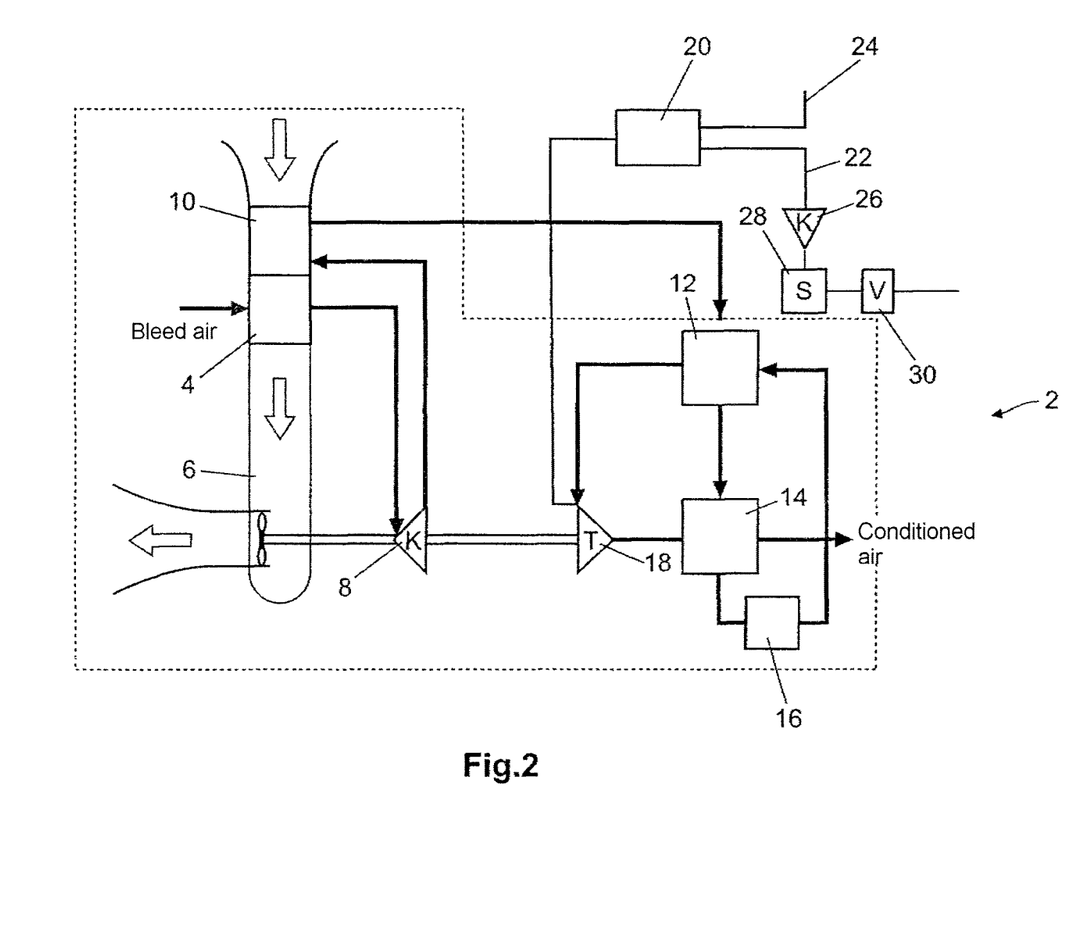
FIG. 2: a schematic representation of the inerting system according to the invention with an air extraction point on the turbine of an air processing system and a downstream processing unit.

FIG. 2 shows another exemplary embodiment, in which the first air flow 22 enriched with oxygen is compressed and intermediately stored in order to be available for further use. To this end, a compressor 26 is preferably arranged downstream of the air separation module 20 in order to compress and introduce the air enriched with oxygen into a tank or a reservoir 28. The air enriched with oxygen can be released from the reservoir 28 and directly or indirectly introduced into the passenger cabin by actuating a valve 30.

Figure 3:
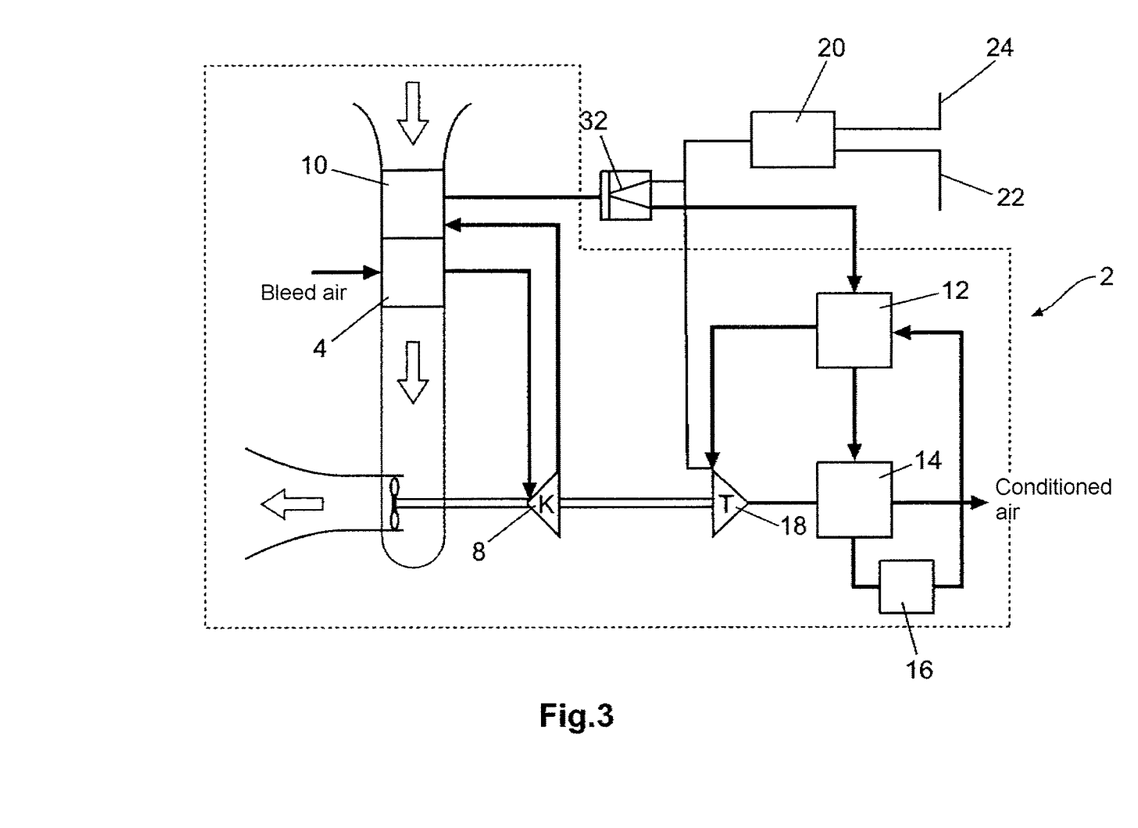
FIG. 3: a schematic representation of an inerting system according to the invention with an air extraction point on the control valve FCK and/or the high pressure section of an air processing system.

In another exemplary embodiment that is illustrated in FIG. 3, the air inlet of the air separation module 20 is not only acted upon with air from the intermediate superheater 12, but optionally also with bleed air from one or several engines that has passed through the main heat exchanger 10. The supply of the air separation module 20 from the two different air sources is controlled with at least one valve 32 that is preferably realized in the form of a switching valve. If the humidity of the bleed air is sufficiently low, the air quantity required for the inerting is directly routed to the air inlet of the air separation module 20 at a valve 32. This condition is usually always fulfilled once the aircraft has reached its stationary cruising altitude. Otherwise, a water separation process is carried out first by means of the air processing system 2 such that the ideally suitable dried air originating from the intermediate superheater 12 is routed into the air inlet of the air separation module 20. A compressor connected upstream of the air separation module 20 would not be necessary.

Figure 4:
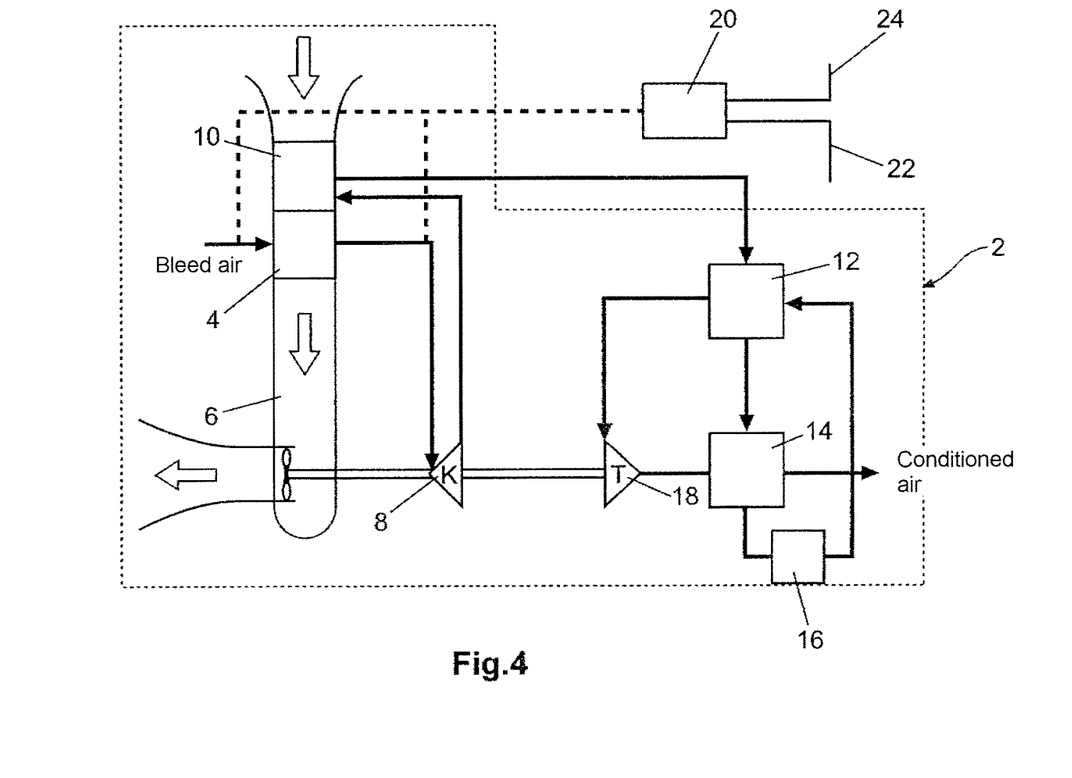
FIG. 4: a schematic representation of an inerting system according to the invention that is integrated into a bleed air system.

Another exemplary embodiment is illustrated in FIG. 4. In this figure, the air separation module 20 is directly acted upon with bleed air from the engine, wherein the bleed air is selectively extracted upstream or downstream of the primary heat exchanger 4 and routed into the air inlet of the air separation module 20. According to the prior art, it would be most sensible to integrate the air separation module 20 downstream of an ozone converter and downstream of the primary heat exchanger 4 so as to take into account the temperature and ozone sensitivity of modern air separation modules that are based on zeolite membranes or similar designs. If the corresponding technology is developed further, however, it would also be conceivable to realize an integration upstream of the primary heat exchanger 4 and, if so required, upstream of an ozone converter. As already described above, a bleed air extraction from several engines at the same time would be possible, wherein between different input air flows may be chosen via a valve or different input air flows may be combined. A compressor connected upstream of the air separation module 20 would not be necessary.

Figure 5:
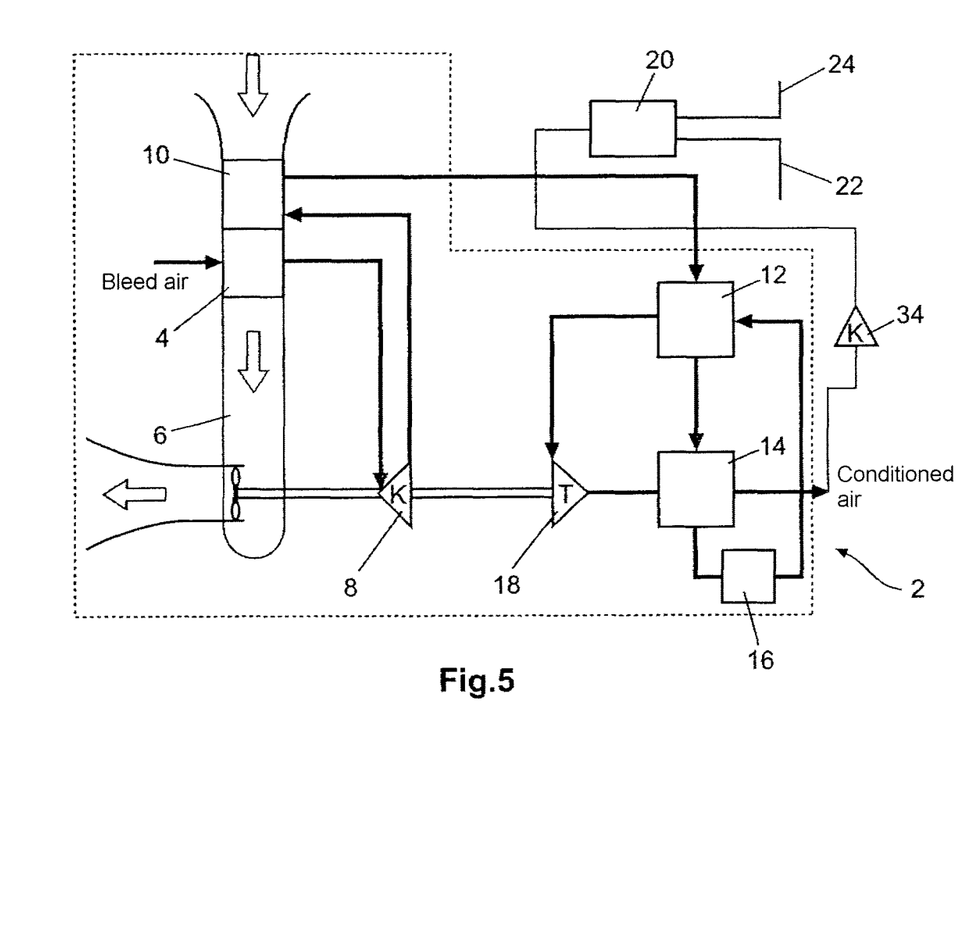
FIG. 5: an inerting system with an air extraction point at the outlet of the air processing system.

Another exemplary embodiment is illustrated in FIG. 5. In this variation, conditioned air is extracted at the outlet of the air processing system 2 and routed into the air inlet of the air separation module 20. Due to the low pressure at the outlet of the air processing system 2, the air needs to be compressed in an additional compressor 34 in order to reach a correspondingly high pressure ratio between the air inlet of the air separation module 20 and the first air flow 22 for introducing the first air flow 22 enriched with oxygen into the cabin. Although this exemplary embodiment is relatively unfavorable energetically in comparison with the remaining exemplary embodiments, it should be the easiest to integrate or, if applicable, retrofit into already existing systems.

The described exemplary embodiments for the integration of the inerting system according to the invention may, in principle, also be realized if the bleed air is not made available by an engine, but rather by a compressor and/or an auxiliary unit such as, for example, the APU ("Auxiliary Power Unit"). A variation that can preferably but not exclusively be used in systems, in which the bleed air is made available by one of the engines, consists of directly connecting the inerting system to the high pressure connection of an engine. However, this would require a more extensive modification of the bleed air system architecture.

Figure 6:
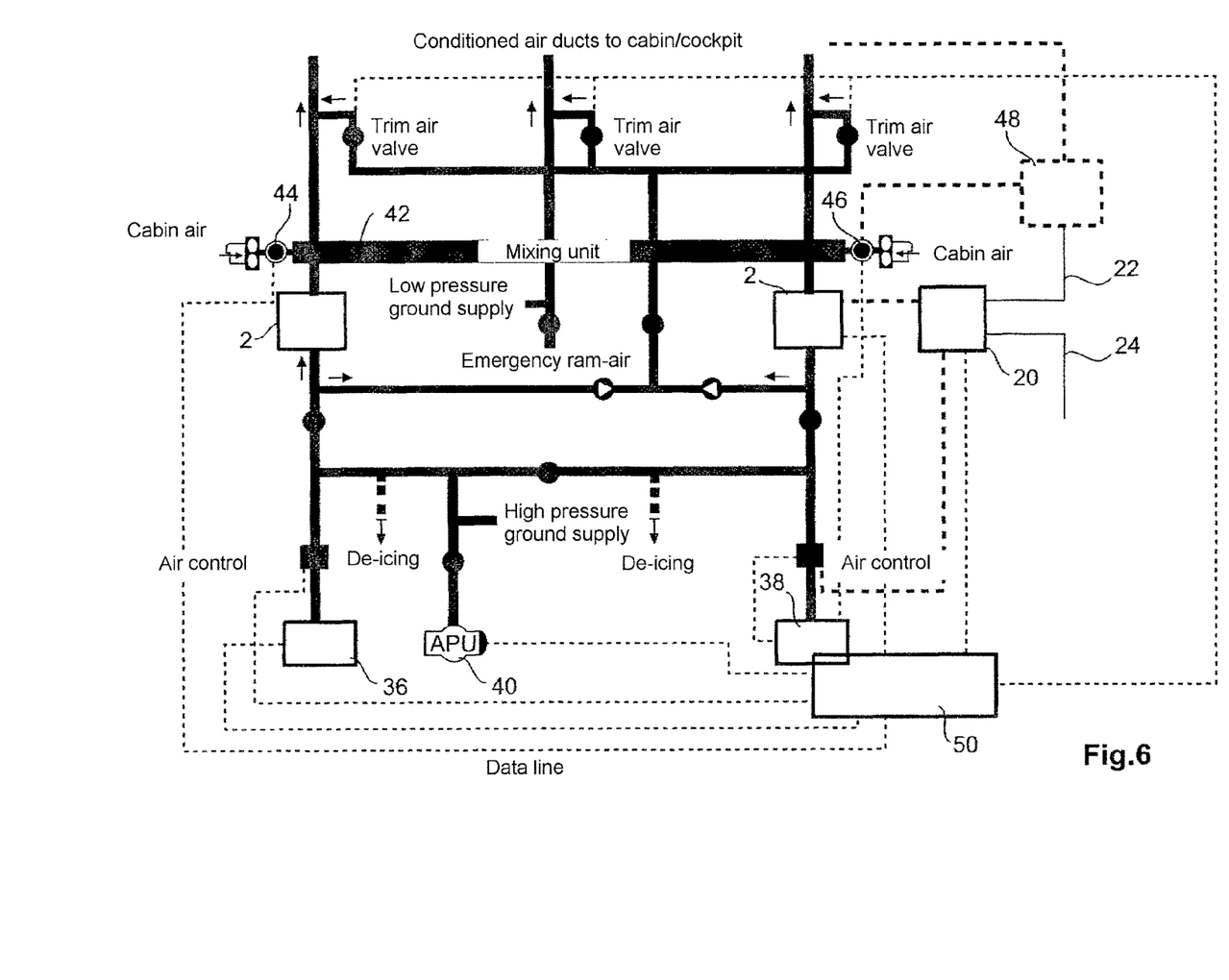
FIG. 6: a schematic diagram of an integrated air management system.

FIG. 6 shows a schematic representation of an environmental control system that contains an inerting system according to the invention. In this case, the environmental control system shown contains, for example, two air processing systems 2 that are supplied with pressurized air by two air sources 36 and 38. It would also be possible to provide a third air source 40 that is realized, for example, in the form of an APU. The three air sources 36 to 40 are connected to a pipeline system 42 featuring different overflow valves and safety precautions that are not discussed in detail. In this case, the air processing systems 2 process, for example, the fresh ambient air from the air sources 36 to 40 in a washbox air cycle as it is common practice in the prior art and route the thusly conditioned air into a mixing unit 42. In addition, recirculation blowers 44 and 46 introduce a portion of used cabin air into the mixing unit 42 such that fresh air and used air can be once again supplied to the passenger cabin in a ratio of approximately 50:50 or 60:40.

An air separation module 20 connected to the environmental control system shown is supplied with air, for example, by one of the two air processing systems 2. Alternatively, the air separation module 20 may also be directly supplied with air, for example, by the air source 38. Due to its design that was already described in detail above, the air separation module 20 is able to split the input air flow into a first air flow 22 that is enriched with oxygen and a second air flow 24 that is enriched with nitrogen. The first air flow 22 enriched with oxygen may be conditioned by means of an additional processing system 48 in such a way that the first air flow 22 enriched with oxygen could be directly introduced into the passenger cabin. Alternatively, the first air flow 22 enriched with oxygen that arrives from the processing system 48 can be admixed to the air flowing into the cabin by means of the mixing unit 42.

The environmental control system shown furthermore comprises a control unit 50 that could also be suitable for monitoring and actuating the inerting system according to the invention in such a way that the second air flow 24 enriched with nitrogen is routed into the fuel tanks while the oxygen content within the passenger cabin can be purposefully increased and maintained at a corresponding level or the first air flow 22 enriched with oxygen can be discharged from the aircraft into the surroundings. The control unit 50 should furthermore be designed for selecting one or more air sources or air extraction points within the aircraft and for correspondingly connecting said air sources or air extraction points to the air inlet of the air separation module 20 in dependence on the respective flight phase of the aircraft and/or the ambient conditions. Such a design is not restricted to one of the exemplary embodiments of the inerting system according to the invention, but rather preferably provided for all conceivable variations.

The inerting system according to the invention has a few advantages in comparison with inerting systems known from the prior art. First of all, the air separation module 20 is supplied with dry air only such that separate water separators and other pre-conditioning devices in the inerting system itself are eliminated. The respective pressure ratio between the input air flow and the first air flow 22 and the second air flow 24 is relatively high and furthermore also independent of the respective flight altitude. This improves the efficiency of the inerting system such that the system design can be optimized with respect to costs and weight. In a conventional embodiment according to the prior art, the pressure ratio would be dependent on the flight altitude such that an additional compressor would be required in the inerting system. Furthermore, corresponding control elements would be required for the air processing. Another advantage of the inerting system according to the invention can be seen in that it is possible to continue using the first air flow 22 enriched with oxygen, for example, for applications in the cabin. This is not possible in conventional embodiments of an inerting system because the air enriched with oxygen would have to be connected to the atmosphere outside the aircraft in order to reach the ambient conditions of 0.2 bar and to even initiate an air separation in the air separation module.

As a supplement, it should be noted that "comprising" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

LIST OF REFERENCE SYMBOLS

2 Air processing system
4 Primary heat exchanger
6 Ram-air duct
8 Compressor
10 Main heat exchanger
12 Intermediate superheater ("reheater")
14 Condenser
16 Water separator
18 Turbine
20 Air separation module
22 First air flow enriched with oxygen
24 Second air flow enriched with nitrogen
26 Compressor
28 Reservoir
30 Valve
32 Valve
34 Compressor
36 Air source
38 Air source
40 Air source
42 Mixing unit
44 Recirculation blower
46 Recirculation blower
48 Processing system
50 Control unit

The invention claimed is:

1. An inerting system for an aircraft comprising:
at least one air-cycle air processing system having a first compressor and a turbine for expanding compressed air; and
at least one air separation module including at least one air inlet, a first air outlet and a second air outlet,
wherein the at least one air separation module is adapted for splitting an input air flow into a first air flow and a second air flow;
wherein the at least one air separation module is an OBIGGS;
wherein the first air flow is enriched with oxygen in comparison with the input air flow and discharged through the first air outlet;
wherein the second air flow being enriched with nitrogen in comparison with the input air flow and discharged through the second air outlet;
wherein the at least one air inlet is connectable to one or more air extraction points;
wherein at least one of the one or more air extraction points is positioned upstream of the turbine of the at least one air processing system; and
wherein the inerting system is adapted for routing the first air flow into a passenger cabin to be air-conditioned and pressurized without additional means.

2. The inerting system of claim 1,
wherein at least one additional air extraction point is disposed on at least one bleed air line.

3. The inerting system of claim 2,
wherein the at least one air inlet is connectable to one or more air extraction points positioned upstream of the turbine of the at least one air processing system or the at least one bleed air line in a controlled fashion.

4. The inerting system of claim 2,
wherein the at least one additional air extraction point is positioned on a bleed air line arranged downstream of a heat exchanger in relation to a flow direction.

5. The inerting system of claim 2,
wherein the at least one additional air extraction point is positioned on a bleed air line arranged upstream of a heat exchanger in relation to a flow direction.

6. The inerting system of claim 1,
wherein the one or more air extraction points are arranged in a high pressure section of the at least one air processing system.

7. The inerting system of claim 1,
further comprising at least one valve adapted for connecting the at least one air inlet to different air extraction points.

8. The inerting system of claim 1,
further comprising a second compressor for increasing air pressure upstream of the at least one air separation module, the second compressor being arranged at the at least one air inlet of the air separation module.

9. The inerting system of claim 1,
wherein the first air outlet is connected to a mixing unit for mixing fresh air and recirculated cabin air.

10. The inerting system of claim 1,
wherein the first air outlet is connected to the passenger cabin to introduce air enriched with oxygen.

11. The inerting system of claim 1,
wherein the first air outlet is connected to a reservoir for intermediately storing air enriched with oxygen, said reservoir being adapted to route the air enriched with oxygen to the passenger cabin on demand with a valve.

12. The inerting system of claim 1,
further comprising a second compressor for increasing the pressure of the air enriched with oxygen, the second compressor being arranged at the first air outlet.

13. The inerting system of claim 1,
wherein the first air outlet is connected to an additional device for generating air enriched with oxygen, the additional device delivering air enriched with oxygen at a third air outlet to increase the oxygen content in the air enriched with oxygen.

14. The inerting system of claim 13,
wherein the third air outlet is connectable to devices using oxygen.

15. An environmental control system for an aircraft, comprising:
at least one air-cycle air processing system having a first compressor and a turbine for expanding compressed air, at least one air source, and at least one inerting system, the inerting system comprising:
- at least one air separation module including at least one air inlet, a first air outlet and a second air outlet,
- wherein the at least one air separation module is adapted for splitting an input air flow into a first air flow and a second air flow;
- wherein the at least one air separation module is an OBIGGS;
- wherein the first air flow is enriched with oxygen in comparison with the input air flow and discharged through the first air outlet;
- wherein the second air flow being enriched with nitrogen in comparison with the input air flow and discharged through the second air outlet;
- wherein the at least one air inlet is connectable to one or more air extraction points;
- wherein at least one of the one or more air extraction points is positioned upstream of the turbine of the at least one air processing system; and
- wherein the inerting system is adapted for routing the first air flow into a passenger cabin to be air-conditioned and pressurized without additional means.

16. An inerting system for an aircraft comprising:
- at least one air cycle air processing system having a condensor and a first compressor arranged downstream of the condensor; and
- at least one air separation module including at least one air inlet, a first air outlet and a second air outlet,
- wherein the at least one air separation module is adapted for splitting an input air flow into a first air flow and a second air flow;
- wherein the at least one air separation module is an OBIGGS;
- wherein the first air flow is enriched with oxygen in comparison with the input air flow and discharged through the first air outlet;
- wherein the second air flow being enriched with nitrogen in comparison with the input air flow and discharged through the second air outlet;
- wherein the at least one air inlet is connectable to one or more air extraction points;
- wherein at least one of the one or more air extraction points is positioned downstream of the compressor; and
- wherein the inerting system is adapted for routing the first air flow into a passenger cabin to be air conditioned and pressurized without additional means.

* * * * *